United States Patent [19]
Wanner

[11] 3,797,598
[45] Mar. 19, 1974

[54] GUARD ASSEMBLY FOR TRACK DRIVE MOTORS

[75] Inventor: John C. Wanner, Aurora, Ill.

[73] Assignee: Caterpillar Tractor Co., Peoria, Ill.

[22] Filed: Apr. 3, 1972

[21] Appl. No.: 240,606

[52] U.S. Cl. .............................. 180/6.48, 180/89 R
[51] Int. Cl. ...................... B62d 21/18, B62d 11/04
[58] Field of Search ............. 180/6.2, 6.48, 6.7, 9.2, 180/89 R; 305/10, 60

[56] References Cited
UNITED STATES PATENTS

| | | | |
|---|---|---|---|
| 2,036,437 | 4/1936 | Ruediger | 180/6.48 X |
| 2,833,361 | 5/1958 | Schwartz | 180/6.48 |
| 3,529,687 | 9/1970 | Pensa | 180/6.48 |
| 3,625,302 | 12/1971 | Lauck | 180/6.48 |

Primary Examiner—Kenneth H. Betts
Assistant Examiner—Leslie J. Paperner
Attorney, Agent, or Firm—Fryer, Tjensvold, Phillips & Lempio

[57] ABSTRACT

A guard assembly comprises separable upper and lower covers detachably mounted on the frame of a track-type vehicle to form tunnel portions for shielding and protecting the drive motors and attendant conduits thereof. The lower cover comprises a centrally disposed member having its forward end hingedly mounted on the frame by a pair of hook members to facilitate removal and installation thereof. The rearward end of the member has towline attachment means formed thereon and a shear block arrangement is disposed between the member and the frame to transmit towing forces directly to the frame.

14 Claims, 5 Drawing Figures

GUARD ASSEMBLY FOR TRACK DRIVE MOTORS

BACKGROUND OF THE INVENTION

Conventional hydraulically powered track-type vehicles, such as hydraulic excavators, comprise a pair of track assemblies independently powered by separate drive motors. The drive motors are normally secured to a track roller frame to extend inwardly therefrom in a cantilevered manner. Conduits extend between hydraulic controls and the drive motors to selectively communicate hydraulic operating fluid therebetween. The drive motors and conduits are usually unprotected to thus subject them to severe damage by impact with rocks, stumps, and the like and by mud which tends to pack therearound during operation of the vehicle.

OBJECTS AND SUMMARY OF THE INVENTION

Accordingly, an object of this invention is to provide a guard assembly for shielding and protecting the track drive motors and attendant conduits of a hydraulically powered track-type vehicle.

Another object of this invention is to provide an improved and separable guard assembly for track drive motors which is readily removable to facilitate servicing.

Another object of this invention is to provide a guard assembly for motors having a lower cover which is hingedly connected to a frame to support one end of the lower cover during installation and removal thereof.

Another object of this invention is to provide the lower cover with towline attachment means and means for transmitting towing forces directly to the frame.

Other objects and advantages of the present invention will become more readily apparent upon reference to the accompanying drawings and following description.

DESCRIPTION OF THE PREFERRED EMBODIMENT

Figure 1:
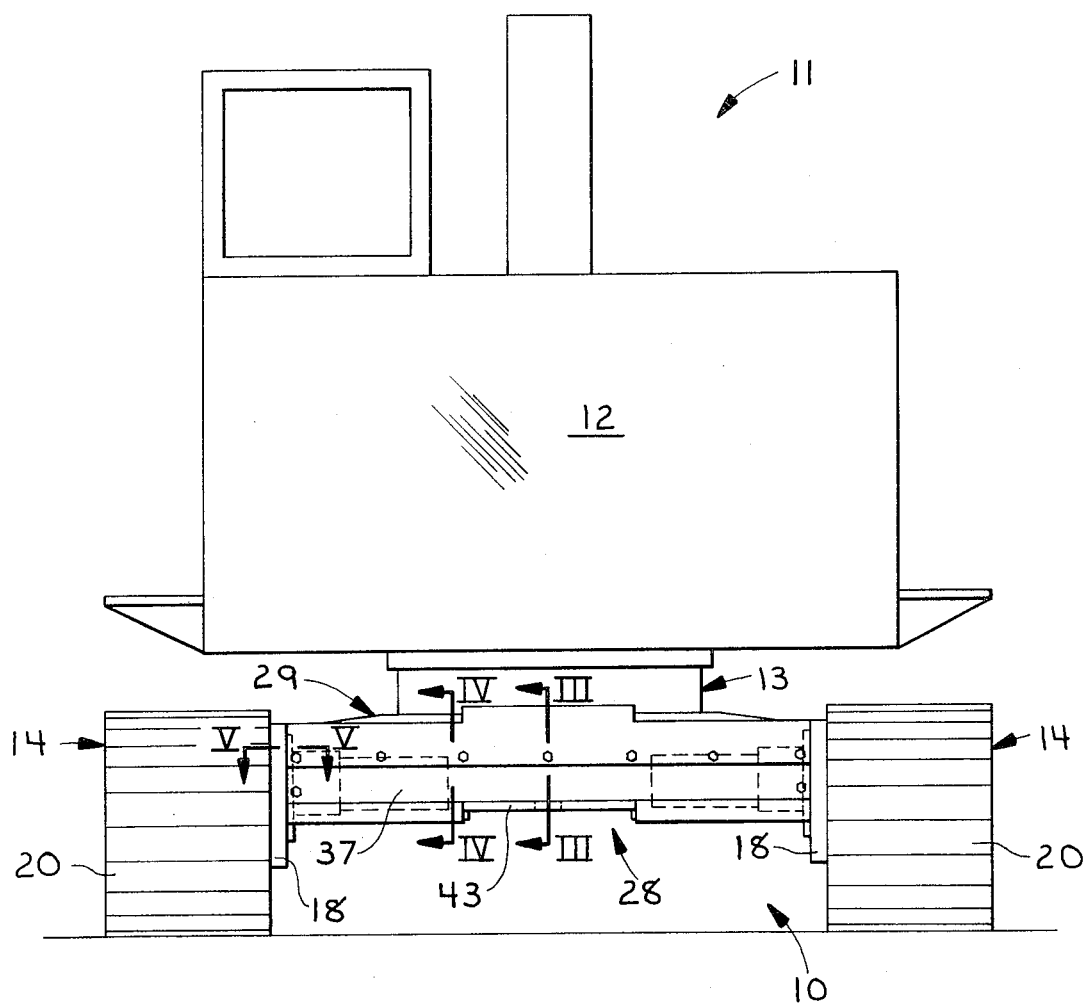
FIG. 1 is a rear elevational view of a hydraulic excavator having a protective guard assembly of the present invention attached thereon to enclose and protect a pair of track drive motors and attendant structures.
Figure 2:
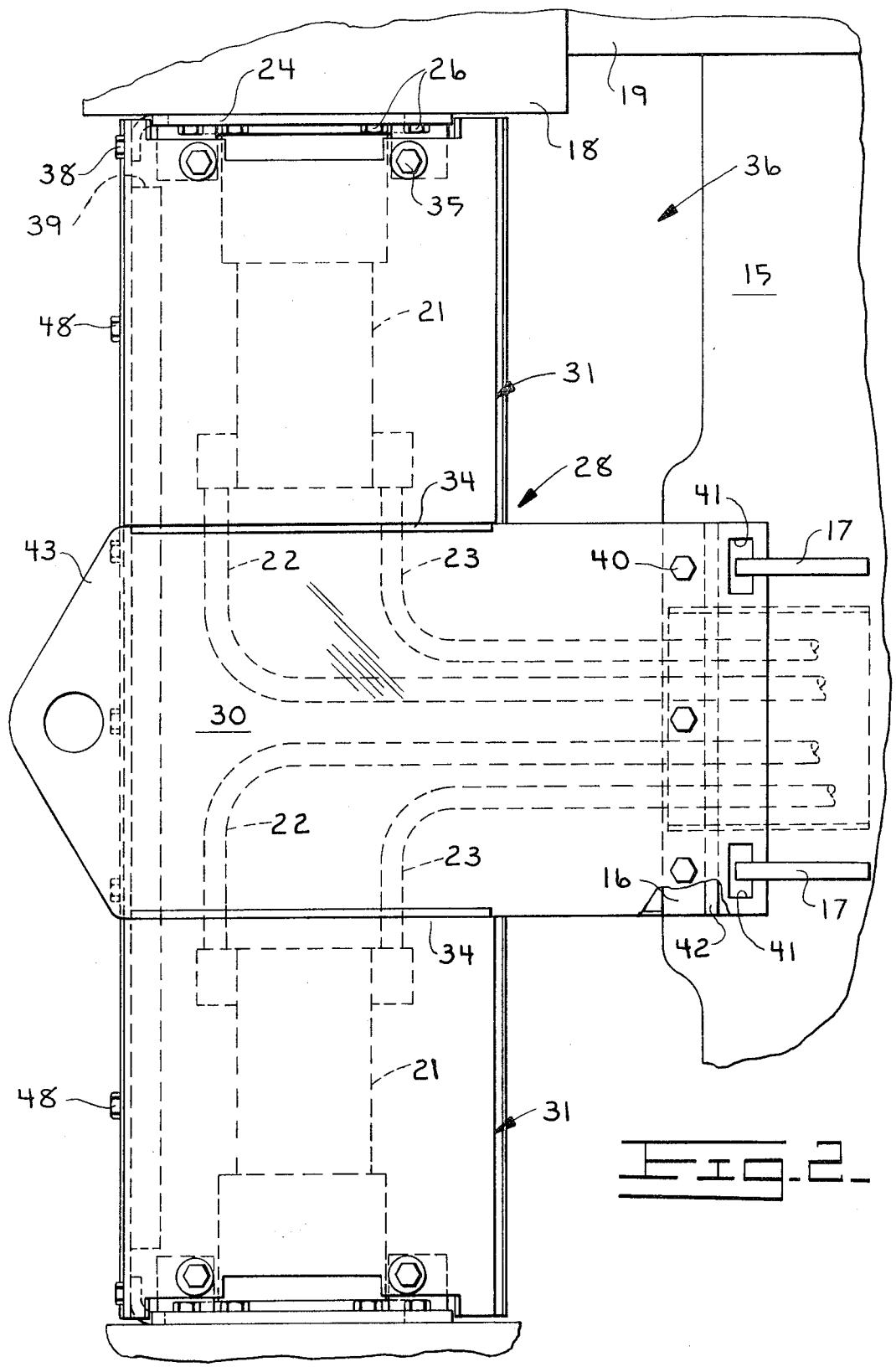
FIG. 2 is an enlarged, bottom plan view of the guard assembly.
Figure 3:
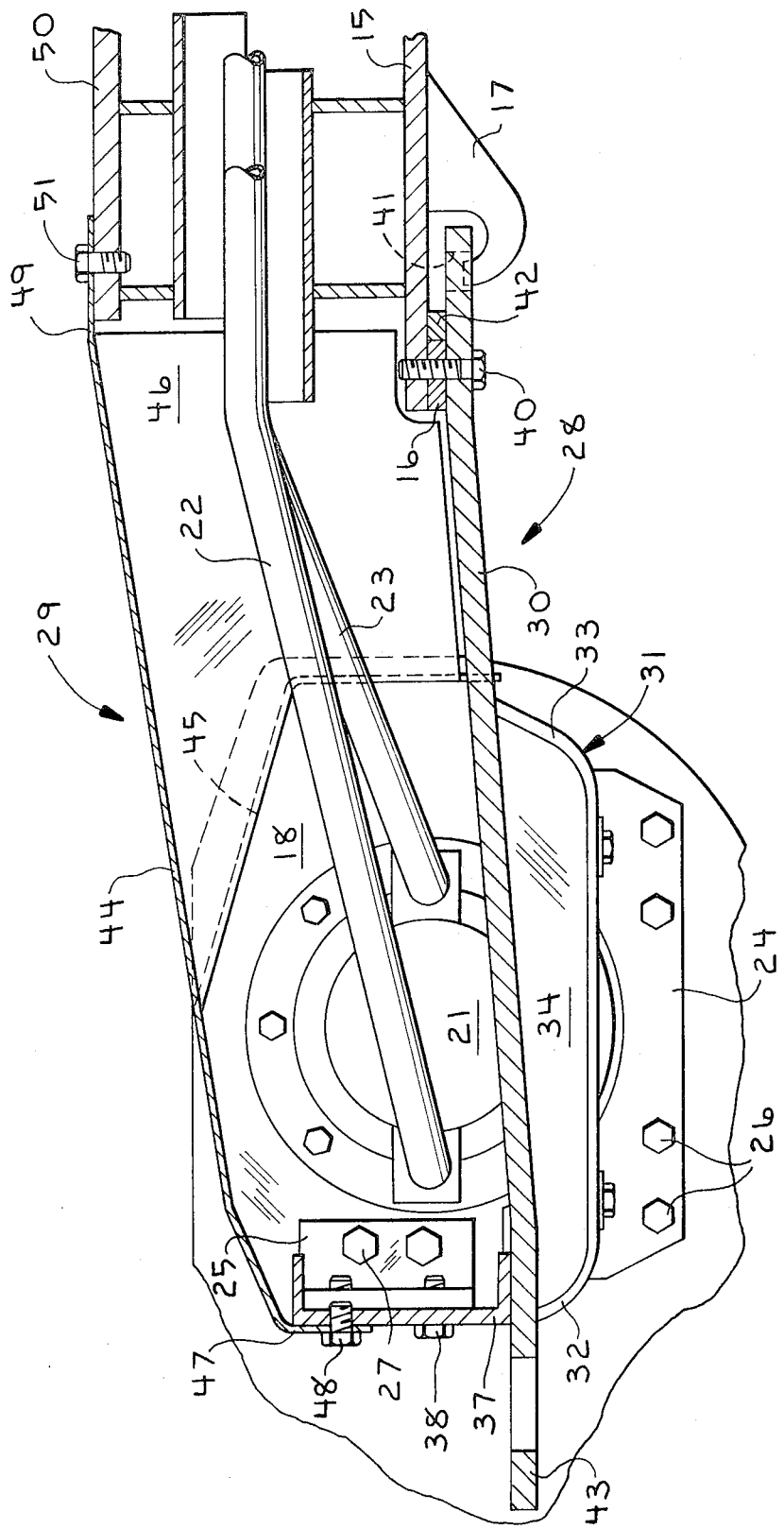
FIGS. 3–5 are sections respectively taken on lines III—III, IV—IV and V—V in FIG. 1.

Referring to FIG. 1, a guard assembly 10 embodying this invention is attached to the rearward end of a track-type vehicle 11, such as a hydraulic excavator, disposed for movement along a longitudinal axis thereof. The hydraulic excavator has an upper unit 12 mounted on a carbody 13, secured between a pair of laterally spaced and substantially parallel endless track assemblies 14 extending in the direction of such axis. As best shown in FIGS. 2 and 3, a bottom plate 15 of the carbody has a laterally extending shear block 16 secured thereunder by welds or the like. A pair of laterally spaced hooks 17 are also secured beneath the plate, forwardly of the shear block, to have hook portions thereof point towards the rearward end of the vehicle.

Each track assembly 14 includes a final drive case 18 secured to a respective track roller frame 19 and an endless track 20 entrained thereabout in the usual manner. The carbody and track roller frame are secured together to comprise a relatively stationary vehicle frame. Each track is driven by a hydraulic motor 21 through a final drive gear transmission (not shown) housed in case 18. Conduit means comprising a pair of conduits 22 and 23 extend between carbody 13 and each drive motor to selectively communicate pressurized hydraulic fluid between the motor and conventional operator control means (not shown). Mounting brackets 24 and 25 (FIG. 4) are secured to each case 18 by bolts 26 and 27, respectively, and are respectively positioned below and on a rearward side of a drive motor.

Guard assembly 10, more clearly shown in FIGS. 2 and 3, constitutes a unitized lower cover 28 and a separable and unitized upper cover 29, both detachably mounted on the vehicle frame. The covers cooperate to provide a longitudinally extending and centrally disposed tunnel portion for protecting conduits 22 and 23 and laterally extending tunnel portions for protecting drive motors 21. The lower cover comprises a generally horizontally disposed central plate member 30 having laterally extending U-shaped members 31, comprising legs 32 and 33, secured thereto by upstanding plates 34 to thus position members 31 vertically below member 30.

Figure 4:
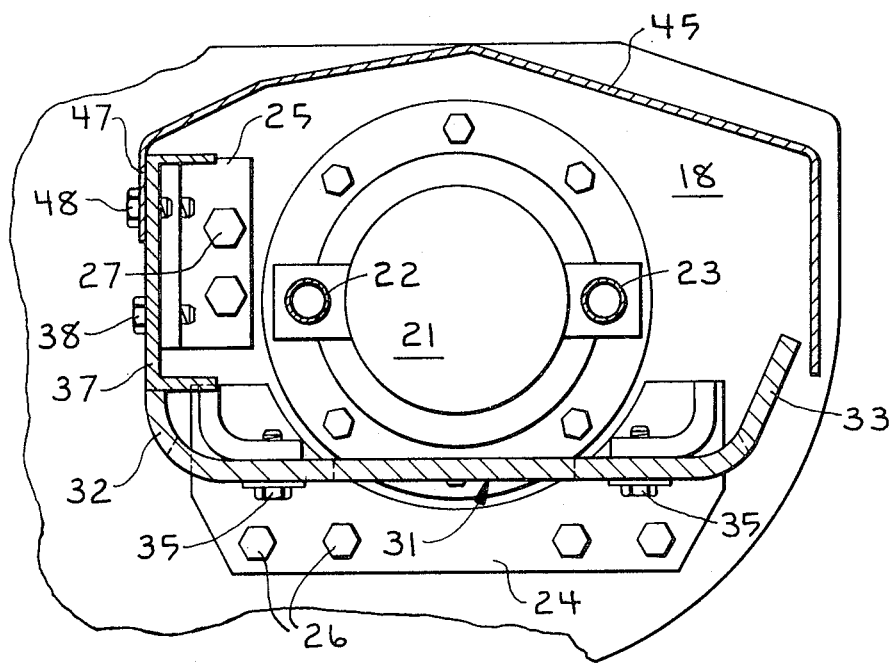

The outboard end of each member 31 is removably attached to the underside of a respective mounting bracket 24 by two bolts 35 (FIG. 4). Each member 31 fully protects the underside of a drive motor and is spaced longitudinally from bottom plate 15 of the carbody (FIG. 2). Enlarged openings 36 are thus defined therebetween to permit the egress of dirt and the like therethrough.

Figure 5:
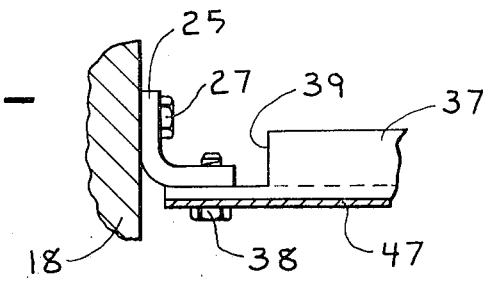

The lower cover further comprises an upright member or channel 37, extending laterally between the track assemblies, having legs 32 of members 31 and the rearward end of member 30 secured thereunder by welds or the like (FIGS. 2 and 4). Each lateral end of the channel is removably attached to a mounting bracket 25 by two bolts 38. The ends of the channel are recessed at 39 (FIG. 5) to provide adequate clearance for dropping the lower cover, comprising members 30 and 31 and channel 37.

The forward end of member 30 is attached to the underside of carbody plate 15 by bolts 40 (FIG. 3). A pair of elongated slots 41 are formed therethrough to normally engage hooks 17. The mating slots and hook members provide hinge means for hingedly connecting the lower cover to the carbody whereby the lower cover can be pivoted downwardly to expose the drive motors.

Plate member 30 and channel member 37 preferably comprise heavy-duty steel plate constructions to withstand high impact loads normally encountered thereat during vehicle operation. Upper cover 29 may comprise a thin gauged sheet metal stamping since it is not normally exposed to such high impact loads.

A laterally extending shear strip 42 (FIGS. 2 and 3) is secured to the top surface of member 30, rearwardly of slots 41, to abut the forward edge of shear block 16. Member 30 has tow line attachment means disposed at the rearward end thereof comprising a projection 43 having an aperture formed therethrough. During towing, shear strip 42 and shear block 16 abut to provide force transmitting means for relieving shear stresses, otherwise imposed on bolts 35, 38 and 40, by transmitting towing forces to the frame directly.

Upper cover 29 comprises a generally horizontally disposed central portion 44 and laterally extending shroud portions 45. Each shroud portion forms a laterally extending tunnel portion with underlying member 31 to fully enclose and protect a drive motor 21. Integrally formed sidewalls 46 extend downwardly from central portion 44 to approximately terminate at the lateral, free edges of member 30.

Overlying central portion 44 and the sidewalls from a longitudinally extending and centrally disposed tunnel portion with plate member 30. Such tunnel portion encloses and protects substantial, longitudinally extending portions of conduits 22 and 23, projecting forwardly from shroud portions 45. The rearward end of the upper cover is removably attached at a rearward flange 47 to channel 37 by bolts 48 whereas a forward end thereof is removably attached at a forward flange 49 to the top of an upper plate 50 of the carbody by bolts 51.

In view of the foregoing, it is readily apparent that the detachable guard assembly of this invention fully protects the drive motors and attendant conduits against damage and facilitates expeditious servicing thereof. Such servicing is effected by initially detaching bolts 48 and 51 and by removing the upper cover to expose the drive motors and conduits. Upon removal of bolts 35, 38 and 40, the lower cover can be pivoted downwardly on hook member 17 to permit the workman to perform minor servicing operations.

Should servicing require complete removal of the lower cover from hook members 17, reinstallation thereof is accomplished by re-engaging the hook members with slots 41 and by fastening bolts 35, 38 and 40 in place. The hinge means formed by the engaged hook members and slots encourages proper alignment of the lower cover when its rearward end is raised for attachment purposes. It should be noted that the lower cover is disposed to provide maximum ground clearance during vehicle operation. In addition, openings 36 (FIG. 2) permit the egress of dirt and debris, discarded by the operating endless tracks, therethrough to prevent undue dirt accumulations.

What is claimed is:

1. A track-type vehicle disposed for movement along a longitudinal axis thereof comprising
    a pair of laterally spaced and parallel track assemblies extending in the direction of said axis,
    a vehicle frame supporting said track assemblies,
    laterally spaced drive motors mounted on said frame with each motor operatively connected to a respective one of said track assemblies, and
    a guard assembly, comprising separable upper and lower covers, detachably mounted on said frame to at least substantially enclose said motors,
    said bottom cover comprising a generally horizontally disposed plate member extending longitudinally in the direction of said axis, an upright member secured to a rearward end of said plate member to extend upwardly therefrom and laterally between said track assemblies, a rearward end of said plate member and the lateral ends of said upright member removably attached to said frame.

2. The invention of claim 1 further comprising first and second mounting brackets, having said lower cover removably attached thereto, secured to a case which mounts each of said drive motors on said frame, said first bracket positioned below a respective drive motor and said second bracket positioned on a rearward side of such drive motor, the lateral ends of said upright member removably attached to said second brackets.

3. The invention of claim 1 wherein said upper cover comprises a forward flange removably attached to said frame and a rearward flange removably attached to said upright member.

4. The invention of claim 1 further comprising hinge means for hingedly connecting a forward end of said lower cover on said frame whereby said lower cover can be pivoted downwardly to expose said drive motors.

5. The invention of claim 4 wherein said hinge means comprises a plurality of laterally spaced hook members secured to said frame with each hook member engaging a slot formed through the forward end of said lower cover.

6. The invention of claim 1 further comprising conduit means operatively connected to each of said drive motors for communicating operating fluid thereto and having substantial portions thereof extending longitudinally in the direction of said axis, between said upper and lower covers.

7. The invention of claim 6 wherein said guard assembly comprises a centrally disposed tunnel portion extending longitudinally in the direction of said axis to enclose said conduit means and a laterally extending tunnel portion positioned on each side of said centrally disposed tunnel portion to enclose each of said drive motors.

8. The invention of claim 7 wherein said bottom cover comprises a generally horizontally and centrally disposed plate member cooperating with a vertically spaced, overlying central portion and laterally spaced sidewalls of said top cover to define said centrally disposed tunnel portion.

9. The invention of claim 8 wherein said plate member extends forwardly from said laterally extending tunnel portions and has its forward end attached to a bottom plate of said frame, said laterally extending tunnel portions spaced rearwardly from said bottom plate to define enlarged openings therebetween for permitting the egress of dirt and the like therethrough.

10. The invention of claim 1 further comprising towline attachment means secured to and projecting beyond a rearward end of said lower cover.

11. The invention of claim 10 further comprising force transmitting means disposed between said frame and said lower cover for transmitting towing forces directly to said frame.

12. The invention of claim 11 wherein said attachment means comprises a projection on said lower cover having an aperture formed therethrough and said force transmitting means comprises a shear block secured to a bottom surface of said frame to abut a shear strip secured to said lower cover.

13. A track-type vehicle disposed for movement along a longitudinal axis thereof comprising
    a pair of laterally spaced and parallel track assemblies extending in the direction of said axis,
    a vehicle frame supporting said track assemblies,
    laterally spaced drive motors mounted on said frame with each motor operatively connected to a respective one of said track assemblies, a guard assembly, comprising separable upper and lower covers, detachably mounted on said frame to at least substantially enclose said motors, and hinge means hingedly connecting a forward end of said lower cover on said frame whereby said lower cover can be pivoted downwardly to expose said drive motors, said hinge means comprising a plurality of laterally spaced hook members secured to said frame with each hook member engaging a slot formed through the forward end of said lower cover.

14. A track-type vehicle disposed for movement along a longitudinal axis thereof comprising a pair of laterally spaced and parallel track assemblies extending in the direction of said axis, a vehicle frame supporting said track assemblies, laterally spaced drive motors mounted on said frame with each motor operatively connected to a respective one of said track assemblies, a guard assembly, comprising separable upper and lower covers, detachably mounted on said frame to at least substantially enclose said motors, towline attachment means secured to and projecting beyond a rearward end of said lower cover, and force transmitting means disposed between said frame and said lower cover for transmitting towing forces directly to said frame, said attachment means comprising a projection on said lower cover having an aperture formed therethrough and said force transmitting means comprising a shear block secured to a bottom surface of said frame to abut a shear strip secured to said lower cover.

* * * * *